United States Patent
Kaidu et al.

(10) Patent No.: US 10,944,344 B2
(45) Date of Patent: Mar. 9, 2021

(54) ABNORMALITY DETERMINATION DEVICE, MOTOR DEVICE, ABNORMALITY DETERMINATION METHOD, AND DRIVE CONTROL METHOD OF MOTOR

(71) Applicant: MINEBEA MITSUMI Inc., Nagano (JP)

(72) Inventors: Hiroyuki Kaidu, Kakegawa (JP); Mitsunari Terada, Mito (JP); Xiao Zhou, Nagano (JP)

(73) Assignee: MINEBEA MITSUMI INC., Nagano (JP)

(*) Notice: Subject to any disclaimer, the term of this patent is extended or adjusted under 35 U.S.C. 154(b) by 0 days.

(21) Appl. No.: 16/580,608

(22) Filed: Sep. 24, 2019

(65) Prior Publication Data

US 2020/0099321 A1    Mar. 26, 2020

(30) Foreign Application Priority Data

Sep. 25, 2018 (JP) .............................. JP2018-178359

(51) Int. Cl.
    *H02P 6/15* (2016.01)
(52) U.S. Cl.
    CPC .................................... *H02P 6/153* (2016.02)
(58) Field of Classification Search
    CPC ................................ H02P 6/153; H02P 6/16
    USPC ................... 318/400.14, 400.13, 400.01, 700
    See application file for complete search history.

(56) References Cited

U.S. PATENT DOCUMENTS

| | | | | |
|---|---|---|---|---|
| 7,312,595 B2 * | 12/2007 | Kamio | ............... | G05B 19/4062 318/701 |
| 8,421,396 B2 * | 4/2013 | Yamada | ................... | G05B 7/02 318/721 |
| 8,917,049 B2 * | 12/2014 | Yamada | ................. | G05B 19/23 318/563 |

FOREIGN PATENT DOCUMENTS

JP        2014-091455 A     5/2014

* cited by examiner

*Primary Examiner* — David Luo
(74) *Attorney, Agent, or Firm* — Pearne & Gordon LLP

(57) ABSTRACT

An abnormality determination device has a detection unit configured to detect a change in a phase of a position signal, the phase of the position signal changing depending on a rotation of a rotor of a motor, a time measurement unit configured to measure a time depending on a detection timing of the detection of the change in the phase of the position signal, a comparison unit configured to compare a first time measured by the time measurement unit with a second time measured before the first time is measured, and a determination unit configured to determine that a drive state of the motor is abnormal based on a comparison result of the comparison of the first time with the second time.

11 Claims, 9 Drawing Sheets

ABNORMALITY DETERMINATION DEVICE, MOTOR DEVICE, ABNORMALITY DETERMINATION METHOD, AND DRIVE CONTROL METHOD OF MOTOR

CROSS REFERENCE TO RELATED APPLICATIONS

This application claims the benefit of Japanese Patent Application No. 2018-178359, filed Sep. 25, 2018, which is hereby incorporated by reference in its entirety.

BACKGROUND

Technical Field

The present disclosure relates to an abnormality determination device, a motor device, an abnormality determination method, and a drive control method of a motor and, more specifically, an abnormality determination device used for a drive control circuit of a motor, a motor device, an abnormality determination method, and a drive control method of a motor.

Background Art

In a motor device driving a motor by a motor drive control device, failures may occur in a drive circuit of the motor drive control device so that it becomes impossible to drive the motor. When it becomes impossible to drive the motor as mentioned above in use of driving the motor in a prescribed rotational direction and an external force works to forcibly rotate the motor in a direction opposite to the prescribed rotational direction, troubles may be caused.

For example, in a case of driving a fan motor by the motor drive control device, the drive circuit of the motor drive control device may break down and a fuse of a power line may blow out due to a large electric current flowing in so that the motor drive control device may become inoperative. In such case where the motor drive control device becomes inoperative and drive of the fan motor stops, when air flows into the stopped fan motor due to an operation of another fan motor used along with the stopped fan motor, for example, the stopped fan motor may be rotated inversely. For example, in a case where a plurality of fan motors are used for cooling a device surrounded by a housing and one of the fan motors is rotated inversely in a manner described above, a function of cooling the device becomes deteriorated.

Related to such issues caused when the drive circuit of the motor drive control device breaks down, Japanese Patent Application Laid-Open No. 2014-91455 discloses a structure having drive circuits of two systems.

SUMMARY

Here, when such an abnormal situation occurs that the drive circuit of the motor drive control device becomes inoperative or the like and it becomes impossible to drive the motor as described above, the impossibility to drive the motor requires to be rapidly dealt with depending on the use of the motor. In order to enable an abnormality occurrence to be rapidly dealt with, it is important to rapidly detect the abnormality occurrence.

The present disclosure is related to providing an abnormality determination device, a motor device, an abnormality determination method, and a drive control method of a motor which are capable of rapidly detecting an abnormality in a drive circuit.

In accordance with an aspect of the present disclosure, an abnormality determination device includes a detection unit configured to detect a change in a phase of a position signal, the phase of the position signal changing depending on a rotation of a rotor of a motor, a time measurement unit configured to measure a time depending on a detection timing of the detection of the change in the phase of the position signal, a comparison unit configured to compare a first time measured by the time measurement unit with a second time measured before the first time is measured, and a determination unit configured to determine that a drive state of the motor is abnormal based on a comparison result of the comparison of the first time with the second time.

Preferably, the position signal is a signal with phase switching in accordance with the rotor of the motor alternately between a phase of a high level and a phase of a low level, the detection unit detects at least one of fall in which the position signal switches from the phase of the high level to the phase of the low level and rise in which the position signal switches from the phase of the low level to the phase of the high level, and the time measurement unit measures at least one of a low duration and a high duration, the low duration being from a timing when the fall of the position signal is detected to a timing when the rise of the position signal is detected, and the high duration being from a timing when the rise of the position signal is detected to a timing when the fall of the position signal is detected.

Preferably, the comparison unit performs at least one of comparison between time measurement results of the low durations and comparison between time measurement results of the high durations.

Preferably, the determination unit determines that the drive state of the motor is abnormal when a prescribed time period elapses from the timing when the fall of the position signal is detected with the rise of the position signal being not detected, and when a prescribed time period elapses from the timing when the rise of the position signal is detected with the fall of the position signal being not detected.

Preferably, the comparison unit compares the first time with the second time in a case where a rotational speed of the rotor of the motor and a target rotational speed of the rotor of the motor meet prescribed conditions.

Preferably, the prescribed conditions include at least that the rotational speed of the rotor of the motor is lower than the target rotational speed of the rotor of the motor.

Preferably, the second time is a time measured in a time measuring occasion immediately before a time measuring occasion when the first time is measured.

Preferably, the comparison unit compares, every time the time measurement is performed by the time measurement unit, the first time measured at that time with the second time measured in a time measuring occasion immediately before the first time, and increments a value of a counter for determination in a case where the first time is longer than the second time, and the determination unit determines that the drive state of the motor is abnormal when the value of the counter becomes larger than a prescribed threshold.

Preferably, in the case of comparing the first time with the second time, if the first time is not longer than the second time, the comparison unit compares the first time with a third time measured in a time measuring occasion immediately before the time measuring occasion when the second time measured, and if the first time is longer than the third time, the comparison unit sets the value of the counter to be smaller as compared with the case where the first time is longer than the second time.

Preferably, a motor device includes a motor including coils of a first system and coils of a second system, a drive circuit of the first system capable of feeding a drive current to the coils of the first system, a drive circuit of the second system, different from the drive circuit of the first system, capable of feeding a drive current to the coils of the second system, a drive control unit configured to control an operation of the drive circuit of the first system to drive the motor by the drive circuit of the first system, any abnormality determination device described above, and a switching unit configured to switch the drive circuit feeding the drive current to the motor from the drive circuit of the first system to the drive circuit of the second system when a drive state of the motor is determined to be abnormal by the abnormality determination device in a case where the motor is driven by the drive circuit of the first system.

Preferably, the motor further includes a position sensor outputting a position signal depending on a position of a rotor the motor, in which the drive control unit controls the operation of the drive circuit of the first system based on the position signal, and the detection unit detects a change in a phase of the position signal.

In accordance with another aspect of the present disclosure, an abnormality determination method includes the steps of detecting a change in a phase of a position signal, the phase of the position signal changing depending on a rotation of a rotor of a motor, measuring a time depending on a detection timing of the detection of the change in the phase of the position signal, comparing a first time measurement result with a second time measurement result obtained after the first time measurement result is obtained, and determining that a drive state of the motor is abnormal based on a comparison result of the comparison of the first time measurement result with the second time measurement result.

In accordance with still another aspect of the present disclosure, a drive control method of a motor including coils of a first system and coils of a second system, the method being performed using a drive circuit of the first system capable of feeding a drive current to the coils of the first system and a drive circuit of the second system, different from the drive circuit of the first system, capable of feeding a drive current to the coils of the second system, the method includes the steps of controlling an operation of the drive circuit of the first system to drive the motor by the drive circuit of the first system, detecting a change in a phase of a position signal in a case where the motor is driven by the drive circuit of the first system, the phase of the position signal changing depending on a rotation of a rotor of a motor, measuring a time depending on a detection timing of the detection of the change in the phase of the position signal, comparing a first time measurement result with a second time measurement result obtained after the first time measurement result is obtained, determining that a drive state of the motor is abnormal based on a comparison result of the comparison of the first time measurement result with the second time measurement result, and switching the drive circuit feeding the drive current to motor from the drive circuit of the first system to the drive circuit of the second system when the drive state of the motor is determined to be abnormal.

According to the disclosure, it is possible to provide an abnormality determination device, a motor device, an abnormality determination method, and a drive control method of a motor which are capable of rapidly detecting an abnormality in a drive circuit.

DETAILED DESCRIPTION

Hereinafter, a motor device with an abnormality determination device according to an embodiment of the present disclosure will be described.

Embodiments

Figure 1:
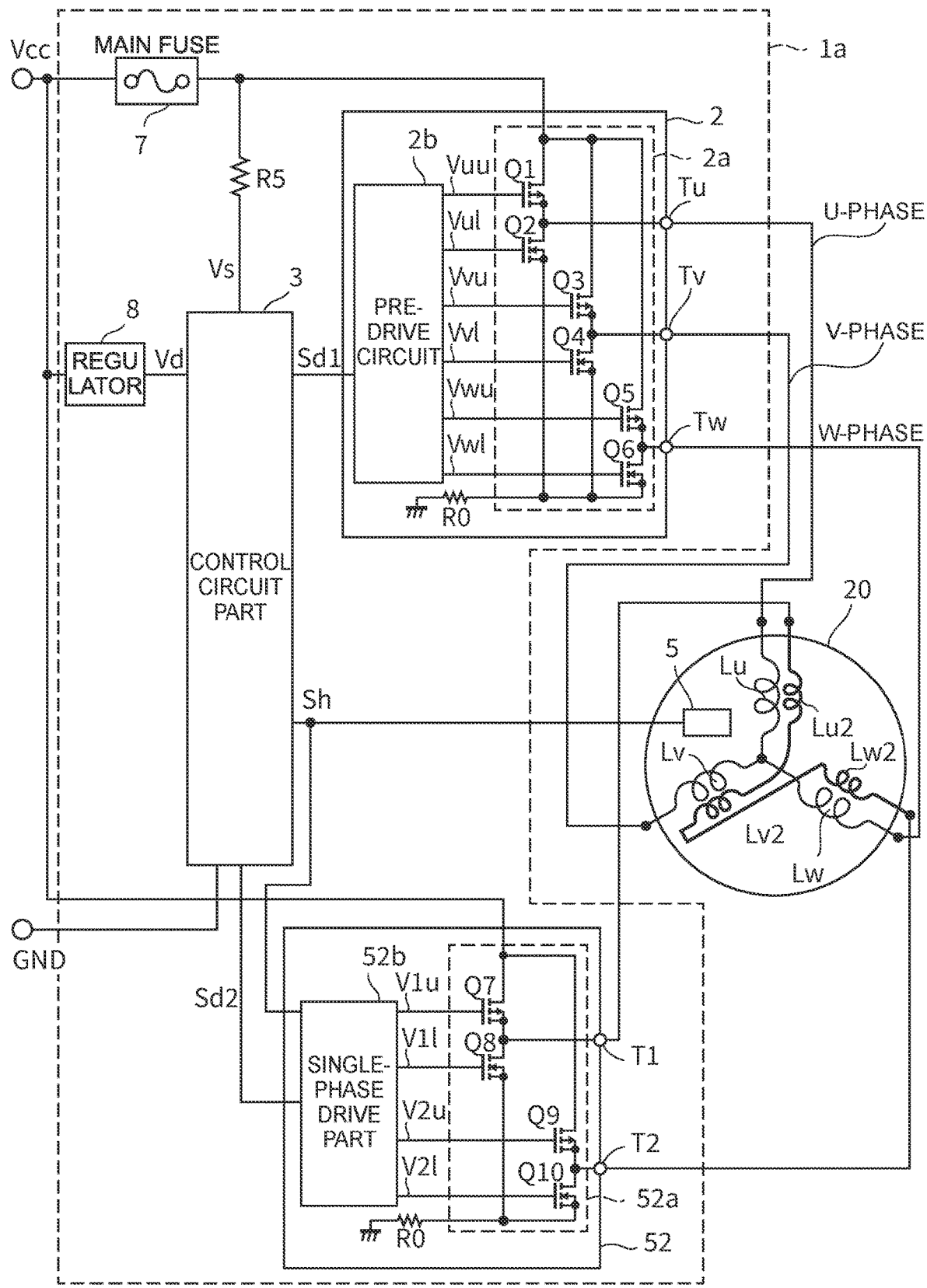
FIG. 1 is a diagram illustrating a configuration of a motor device according to one of embodiments of the present disclosure.
Figure 2:
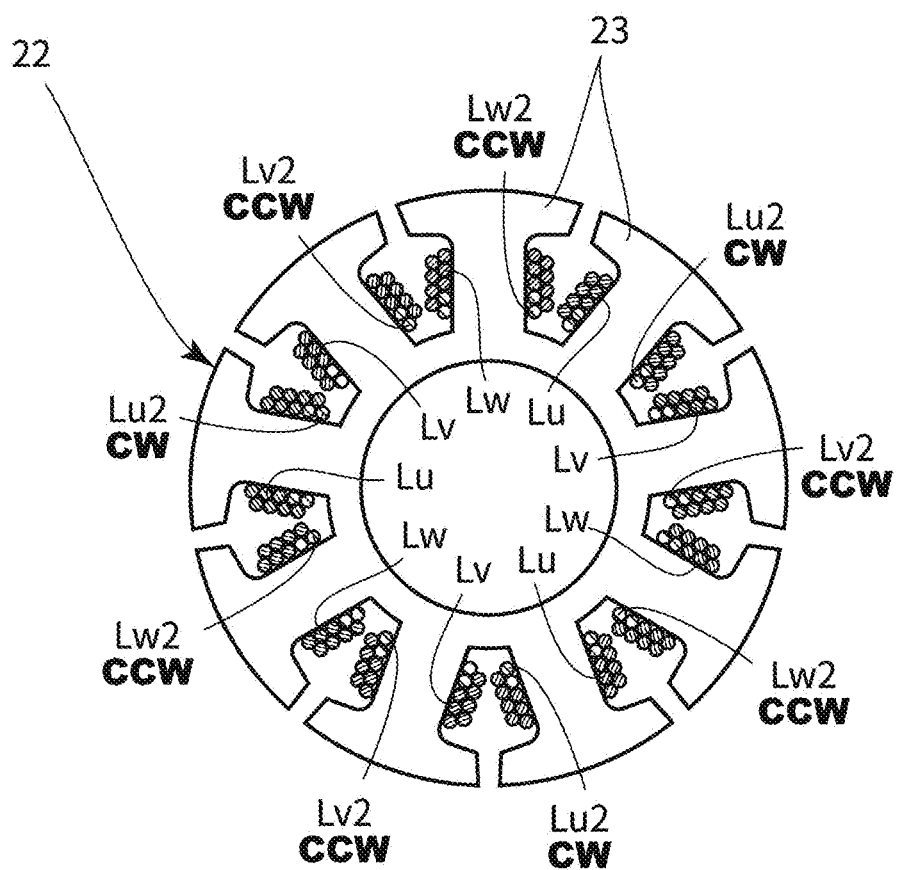
FIG. 2 is a diagram illustrating an example of a stator of a motor of the motor device.
Figure 3:
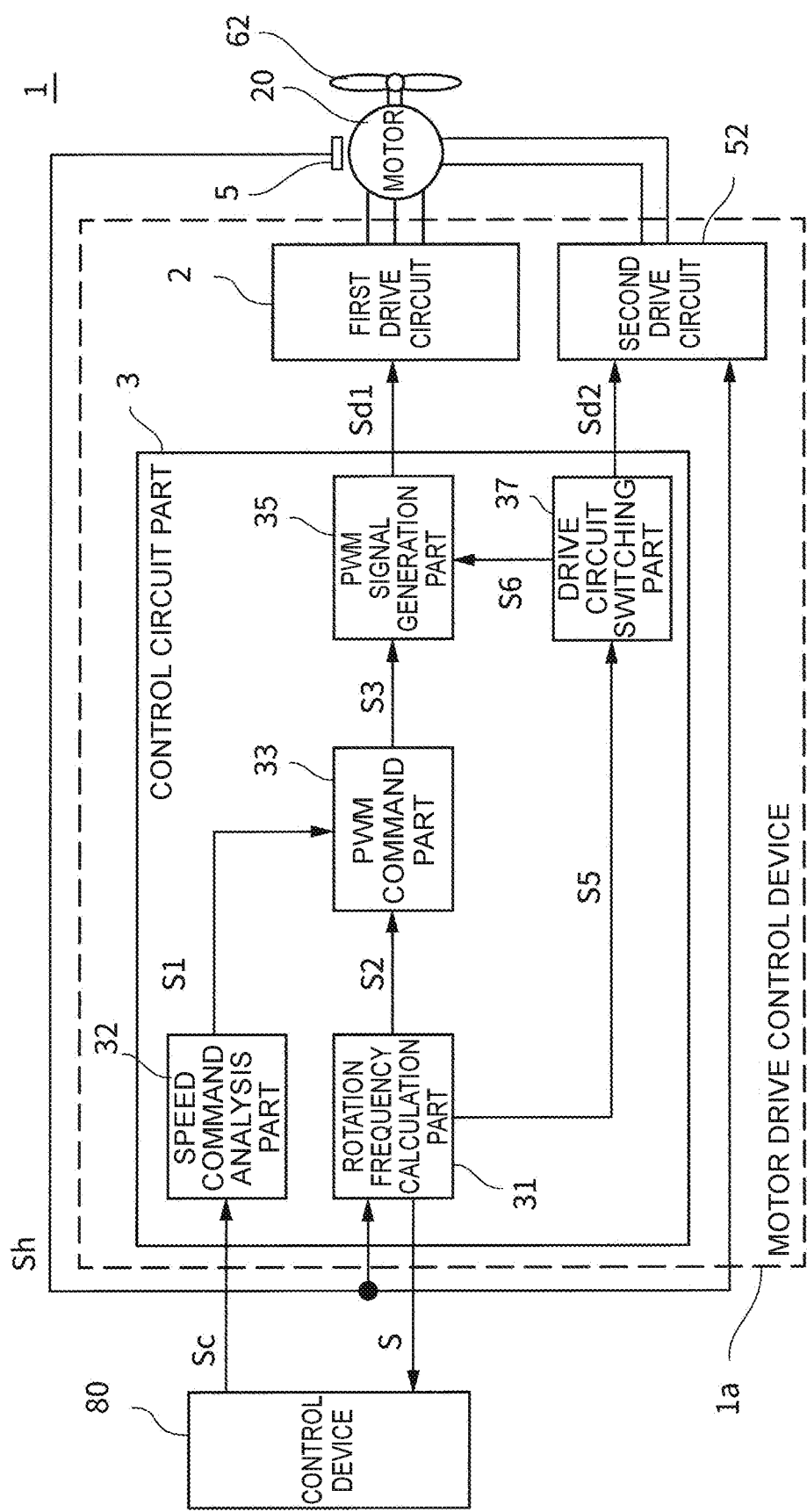
FIG. 3 is a block diagram illustrating a configuration of a motor drive control device of the motor device.

FIG. 1 is a diagram illustrating a configuration of a motor device 1 according to one of embodiments of the present disclosure. FIG. 2 is a diagram illustrating an example of a stator of a motor 20 of the motor device 1. FIG. 3 is a block diagram illustrating a configuration of a motor drive control device 1a of the motor device 1.

As illustrated in FIG. 1 and FIG. 3, the motor device 1 includes the motor 20 and the motor drive control device 1a which feeds a drive current to the motor 20 to drive the motor 20. The motor 20 is a three-phase motor including coils Lu, Lv, and Lw of three phases of U-phase, V-phase, and W-phase (examples of coils of a first system). In the present embodiment, the motor 20 includes coils Lu2, Lv2, and Lw2 of single phase (examples of coils of a second system). Specifically, the motor 20 includes the coils of the first system and the coils of the second system. The motor 20 may be of any kind such as a synchronous motor or a brushless motor.

Note that the coils Lu, Lv, and Lw of the three phases and the coils Lu2, Lv2, and Lw2 of the single phase in FIG. 1 and FIG. 2 are illustrated schematically.

As illustrated in FIG. 2, the coils Lu, Lv, and Lw of the three phases are wound around each of a plurality of teeth 23 provided to an iron core 22. For example, in a case where nine teeth 23 are provided, each of the coils Lu, Lv, and Lw of the three phases is wound around three teeth 23. As illustrated in FIG. 1, one end of each of the coil Lu of the U-phase, the coil Lv of the V-phase, and the coil Lw of the W-phase is connected to the motor drive control device 1a, and another ends of the respective coils Lu, Lv, and Lw are connected mutually.

As illustrated in FIG. 2, in the present embodiment, the coils Lu2, Lv2, and Lw2 of the single phase are wound around each of the plurality of teeth 23. That is, in the case where nine teeth 23 are provided, the coils Lu2, Lv2, and Lw2 of the single phase are wound, respectively, around the three teeth 23 around which the coils Lu of the U-phase among the coils Lu, Lv, and Lw of the three phases are wound, the three teeth 23 around which the coils of the V-phase are wound, and at least the three teeth 23 around which the coils of the W-phase are wound. Specifically, the coil Lu2 is wound around each of the teeth 23 around which the coil Lu of the U-phase is wound, the coil Lv2 is wound around each of the teeth 23 around which the coil Lv of the V-phase is wound, and the coil Lw2 is wound around each of the teeth 23 around which the coil Lw of the W-phase is wound. The coil Lu2, the coil Lv2, and the coil Lw2 are connected in series with each other. That is, the coil Lu2, Lv2, Lw2 of the single phase in a connected form has two ends. Note that the coils Lu2, Lv2, and Lw2 of the single phase may be wound around at least one of the teeth 23 around which the coil Lu of the U-phase is wound, at least one of the teeth 23 around which the coil Lv of the V-phase is wound, and at least one of the teeth 23 around which the coil Lw of the W-phase is wound, respectively. Note that, in the present embodiment, the coils Lu2, Lv2, and Lw2 of the single phase are respectively wound around the teeth around which the coils Lu, Lv, and Lw of the three phases are wound, without limitation. The coil of the single phase may be wound around the tooth around which the coil Lu, Lv, or Lw of any one of the three phases is wound.

A winding direction of the coils Lu2, Lv2, and Lw2 of the single phase wound around the teeth 23 around which the coil Lu, Lv, or Lw of one of the three phases is wound is different from a winding direction of the coils Lu2, Lv2, and Lw2 of the single phase wound around the teeth 23 around which the coils of the other two phases are wound. In the example illustrated in FIG. 2, the winding direction of the coil Lu2 for the tooth 23 around which the coil Lu of the U-phase is wound is different from the winding direction of the coil Lv2 for the tooth 23 around which the coil Lv of the V-phase is wound and from the winding direction of the coil Lw2 for the tooth 23 around which the coil Lw of the W-phase is wound. For example, when the winding direction of the coil Lu2 is CW (clockwise direction), the winding direction of the other coils Lv2 and Lw2 is CCW (counter-clockwise direction). In other words, when electric currents flow in the coils Lu2, Lv2, and Lw2 of the single phase, a direction of the electric current flowing in the coil Lu2 is different from directions of the electric currents flowing in the other coils Lv2 and Lw2.

As illustrated in FIG. 1, in addition to the motor 20, the motor device 1 includes a control circuit part (an example of an abnormality determination device, and an example of a drive control unit) 3, and a position sensor 5. Further, the motor device 1 includes a first drive circuit (an example of a drive circuit of the first system) 2 capable of feeding a drive current to the coils Lu, Lv, and Lw of the three phases of the motor 20, and a second drive circuit (an example of a drive circuit of the second system) 52 capable of feeding a drive current to the coils Lu2, Lv2, and Lw2 of the single phase of the motor 20. The second drive circuit 52 is different from the first drive circuit 2. As illustrated in FIG. 3, the motor drive control device 1a includes the control circuit part 3, the position sensor 5, the first drive circuit 2, the second drive circuit 52, and the like. The motor drive control device 1a is connected with an external control device 80, and drives the motor 20 in response to a speed command signal Sc input from the control device 80. Note that the motor drive control device 1a may not be connected with the control device 80, and the motor drive control device 1a may be configured to be able to drive the motor 20 by itself alone, for example.

While details are to be described later, the first drive circuit 2 includes a three-phase inverter circuit 2a connected to one end of each of the coils Lu, Lv, and Lw of the three phases, and the second drive circuit 52 includes a single-phase inverter circuit 52a connected to both ends of the coil Lu2, Lv2, Lw2 of the single phase in a connected form. The motor device 1 includes the drive control unit configured to drive the motor 20 by the first drive circuit 2 through controlling operations of the first drive circuit 2, and a switching unit configured to switch the drive circuit for feeding the drive current to the motor 20 from the first drive circuit 2 to the second drive circuit 52. Note that the control circuit part 3 of the motor device 1 as the drive control unit controls the operations of the first drive circuit 2 based on position signals outputted from the position sensor 5. The second drive circuit 52 includes a single-phase drive part 52b configured to control operations of the single-phase inverter circuit 52a. The single-phase drive part 52b controls the operations of the single-phase inverter circuit 52a based on the position signals.

While details are to be described later, in the present embodiment, the control circuit part 3 functions as the abnormality determination device which determines that a drive state of the motor 20 is abnormal. The motor device 1 includes the switching unit configured to switch the drive circuit for feeding the drive current to the motor 20 from the first drive circuit 2 to the second drive circuit 52 when the drive state of the motor 20 is determined to be abnormal by the abnormality determination device in a case that the motor 20 is driven by the first drive circuit 2.

The position sensor 5 corresponds to any one of the three phases of the motor 20, and outputs the position signals. The phases of the position signals change depending on a rotation of a rotor of the motor 20. Specifically, the position sensor 5 is a magnetic sensor such as a Hall element or a Hall IC, for example. In the present embodiment, the position sensor 5 is a Hall IC as a specific example, and the position signal is a Hall signal Sh. The Hall signal Sh outputted from the position sensor 5 is inputted to the control circuit part 3 and the second drive circuit 52. The position sensor 5 detects the position of the rotor at one point of the motor 20, and outputs the Hall signal Sh.

The Hall signal Sh is a signal with phase changing in accordance with the position of the rotor, i.e., in accordance with positional relation between each of the phases of the motor 20 and the rotor. The Hall signal Sh is a signal with phase switching in accordance with rotations of the rotor alternately between a phase of a high level (hereinafter, also referred to simply as high) and a phase of a low level (hereinafter, also referred to simply as low). In other words, the Hall signal Sh is a signal which periodically turns to high and low in accordance with rotations of the rotor. The Hall signal Sh turns to high from low (rise; rise edge) when the rotor passes a prescribed position (when the rotor comes at a first rotational position) while the rotor rotates once, and returns to low from high (fall; fall edge) when the rotor passes another prescribed position (when the rotor comes at a second rotational position).

In the present embodiment, only one position sensor 5 is provided, and the Hall signal Sh detected at only one point of the motor 20 is inputted to the control circuit part 3 and the second drive circuit 52. The motor device 1 drives the motor 20 by using the control circuit part 3 with a single sensor method. The single sensor method uses only the one position sensor 5 for detecting the position of the rotor. The position sensor 5 is placed at a position corresponding to the coil Lv2 having a winding direction different from the other coils Lug and Lw2 (for example, a position between the U-phase and the V-phase of the motor 20).

Note that the position sensor 5 may be a sensor corresponding to any one of other phases of the motor 20. Further, two or three position sensors 5 corresponding to each of the three phases may be provided, and the Halls signal Sh outputted only from one of those position sensors 5 provided at one point may be inputted to the control circuit part 3 and the second drive circuit 52 to be used. The position sensor 5 may be that provided to the IC forming the first drive circuit 2 or the IC forming the second drive circuit 52. To the control circuit part 3, another information concerning a rotational state of the motor 20 may be configured to be input in addition to or instead of such a Hall signal Sh. For example, a signal (pattern FG) generated using a coil pattern provide to a substrate on a side of the rotor may be inputted as a FG signal corresponding to rotations of the rotor of the motor 20. The rotational state of the motor 20 may be detected based on a detection result of a rotational position detection circuit detecting a back electromotive force induced in each of the phases (U-phase, V-phase, W-phase) of the motor 20. An encoder, a resolver, or the like may be provided such that, thereby, information such as the rotational speed of the motor 20 is detected.

The first drive circuit 2 selectively applies an electric current to the coils Lu, Lv, and Lw of the three phases of the motor 20. That is, the first drive circuit 2 is capable of feeding a drive current to the motor 20. The first drive circuit 2 includes the three-phase inverter circuit 2a connected to one end of each of the coils Lu, Lv, and Lw of the three phases and includes a pre-drive circuit 2b. A drive control signal Sd1 outputted from the control circuit part 3 is inputted to the first drive circuit 2.

The three-phase inverter circuit 2a drives the motor 20 by selectively applying an electric current to the coils Lu, Lv, and Lw of the three phases of the motor 20 based on six kinds of drive signals Vuu, Vul, Vvu, Vvl, Vwu, and Vwl outputted from the pre-drive circuit 2b.

In the present embodiment, the three-phase inverter circuit 2a includes six switching elements Q1 to Q6 for feeding the drive current to each of the coils Lu, Lv, and Lw of the three phases of the motor 20. The switching elements Q1, Q3, and Q5 are high-side switching elements formed with MOSFETs (Metal-Oxide-Semiconductor Field Effect Transistors) of P-channel connected to a positive electrode side of a direct current power supply via a main fuse 7. The switching elements Q2, Q4, and Q6 are low-side switching elements formed with MOSFETs of N-channel placed on a negative electrode (in the present embodiment, ground) side of the direct current power supply. Source terminals of the switching elements Q2, Q4, and Q6 are connected to the negative electrode of the direct current power supply via a sense resistance R0. In each of a combination of the switching elements Q1 and Q2, a combination of the switching elements Q3 and Q4, and a combination of the switching elements Q5 and Q6, two switching elements are connected in series. Further, those three sets of series circuits are connected in parallel to form a bridge circuit. A connection point between the switching elements Q1 and Q2 is connected to an output terminal Tu connected to one end of the coil Lu of the U-phase. A connection point between the switching elements Q3 and Q4 is connected to an output terminal Tv connected to one end of the coil Lv of the V-phase. A connection point between the switching elements Q5 and Q6 is connected to an output terminal Tw connected to one end of the coil Lw of the W-phase. As described above, the other ends of the coils Lu, Lv, and Lw not connected to the three-phase inverter circuit 2a are connected to each other in the motor 20.

The pre-drive circuit 2b includes a plurality of output terminals connected to respective gate terminals of the six switching elements Q1 to Q6 of the three-phase inverter circuit 2a. The drive signals Vuu, Vul, Vvu, Vvl, Vwu, and Vwl are outputted from the respective output terminals to control on/off operations of the switching elements Q1 to Q6. The drive control signal Sd1 outputted from the control circuit part 3 is inputted to the pre-drive circuit 2b. The pre-drive circuit 2b outputs the drive signals Vuu, Vul, Vvu, Vvl, Vwu, and Vwl based on the drive control signal Sd1 to operate the three-phase inverter circuit 2a. That is, the three-phase inverter circuit 2a selectively applies the electric current to the coil Lu, Lv, or Lw of each of the phases of the motor 20 based on the drive control signal Sd1.

The second drive circuit 52 is capable of feeding the drive current to the motor 20. The second drive circuit 52 includes the single-phase inverter circuit 52a connected to the both ends of the coil Lu2, Lv2, Lw2 of the single phase in a connected form. Further, the second drive circuit 52 includes the single-phase drive part 52b configured to operate the single-phase inverter circuit 52a by outputting drive signals V1u, V1l, V2u, and V2l to the single-phase inverter circuit 52a. The second drive circuit 52 is a single chip of single-phase driver IC, for example.

The single-phase inverter circuit 52a applies an electric current to the coils Lu2, Lv2, and Lw2 of the single phase of the motor 20 based on the four kinds of drive signals V1u, V1l, V2u, and V2l outputted from the single-phase drive part 52b. In the present embodiment, the single-phase inverter circuit 52a includes four switching elements Q7 to Q10 for feeding a drive current to the coils Lu2, Lv2, and Lw2 of the single phase. The switching elements Q7 and Q9 are high-side elements formed with MOSFETs of P-channel placed on the positive electrode side of the direct current power supply. Source terminals of the switching elements Q8 and Q10 are low-side switching elements formed with MOSFETs of N-channel placed on the negative electrode side of the direct current power supply. The switching elements Q8 and Q10 are connected to the negative electrode of the direct current power supply via a sense resistance R0. In each of a combination of the switching elements Q7 and Q8, and a combination of the switching elements Q9 and Q10, two switching elements are connected in series. Further, those two sets of series circuits are connected in parallel. A connection point between the switching elements Q7 and Q8 is connected to an output terminal T1 connected to one end of the coil Lu2, Lv2, Lw2 of the single phase in a connected form (one end of the coil Lu2 in the case illustrated in the drawing). A connection point between the switching elements Q9 and Q10 is connected to an output terminal T2 connected to another end of the coil Lu2, Lv2, Lw2 of the single phase in a connected form (one end of the coil Lw2 in the case illustrated in the drawing).

The Hall signal Sh outputted from the position sensor 5 is inputted to the single-phase drive part 52b. The single-phase drive part 52b controls operations of the single-phase inverter circuit 52a based on the Hall signal Sh. That is, the single-phase drive part 52b includes a plurality of output terminals connected to respective gate terminals of the four switching elements Q7 to Q10 of the single-phase inverter circuit 52a. The single-phase drive part 52b outputs the drive signals V1u, V1l, V2u, and V2l from the respective output terminals based on the Hall signal Sh to control on/off operations of the switching elements Q7 to Q10.

As will be described in detail hereinafter, the control circuit part 3 as the switching unit performs switching of the drive circuits that feed the drive current to the motor 20 by applying a control voltage to the second drive circuit 52. The second drive circuit 52 performs no feeding operation of the drive current when the control voltage is a reference voltage, and performs the feeding operation of the drive current when the control voltage is a prescribed drive voltage.

In the present embodiment, the second drive circuit 52 performs the feeding operation of the drive current according to a potential of a control terminal. Specifically, the second drive circuit 52 performs no feeding operation of the drive current when the control voltage is the reference voltage (when connected to the ground, for example), and performs the feeding operation of the drive current when the control voltage is the prescribed voltage (5 V, for example, but not limited to 5 V, and there may be a certain range in the values of the drive voltage). That is, when the reference voltage is applied to the control terminal, the single-phase drive part 52b of the second drive circuit 52 outputs no drive signal V1u, V1l, V2u, or V2l and the single-phase inverter circuit 52a performs no on/off operation. Therefore, the drive current is not fed to the coils Lu2, Lv2, and Lw2 of the single phase. In the meantime, when the prescribed voltage is applied to the control terminal, the single-phase drive part 52b and the single-phase inverter circuit 52a of the second drive circuit 52 are in operations. Thereby, the drive current is fed to the coils Lu2, Lv2, and Lw2 of the single phase.

A control signal Sd2 outputted from the control circuit part 3 is inputted to the control terminal of the second drive circuit 52. The control signal Sd2 is a control voltage taking a voltage value of either the reference voltage or the prescribed drive voltage, for example, and is a signal taking a voltage value of either level of a low level (the reference voltage) or a high level (the prescribed drive voltage). The control circuit part 3 outputs the control signal Sd2 of the voltage value of either the low level or the high level to apply the control voltage to the control terminal of the second drive circuit 52. Thereby, whether or not to perform the feeding operation of the drive current to the motor 20 by the second drive circuit 52 is switched by the control circuit part 3.

The control circuit part 3 is formed with a microcomputer (MCU), for example. The control circuit part 3 can be formed by using a programmable device such as DSP (Digital Assistance Processor), FPGA (Field Programmable Gate Array), or the microcomputer. However, the control circuit part 3 is not limited to such devices. The control circuit part 3 may be a digital circuit or the like, for example.

A drive voltage Vd generated by a regulator 8 is applied to the control circuit part 3 based on a power supply voltage Vcc.

The control circuit part 3 outputs the drive control signal Sd1 for driving the motor 20 to the first drive circuit 2 to perform control of the motor 20. The control circuit part 3 outputs the drive control signal Sd1 for operating the plurality of switching elements Q1 to Q6 to the first drive circuit 2 to perform the control of the motor 20 for rotating the motor 20. The control circuit part 3 outputs the drive control signal Sd1 to the pre-drive circuit 2b based on the Hall signal Sh outputted from the position sensor 5.

The control circuit part 3 switches six current application patterns for applying electric currents to the coils Lu, Lv, and Lw of the three-phase coils by the first drive circuit 2 in a prescribed order according to changes in the phase of the Hall signal Sh.

That is, since the motor 20 includes the coils Lu, Lv, and Lw of the three phases, there are six current application patterns. That is, there are (1) a first current application pattern that is a combination of a high-side U-phase UH and a low-side V-phase VL, (2) a second current application pattern that is a combination of the high-side U-phase UH and a low-side W-phase WL, (3) a third current application pattern that is a combination of a high-side V-phase VH and the low-side W-phase WL, (4) a fourth current application pattern that is a combination of the high-side V-phase VH and a low-side U-phase UL, (5) a fifth current application pattern that is a combination of a high-side W-phase WH and the low-side U-phase UL, and (6) a sixth current application pattern that is a combination of the high-side W-phase WH and the low-side V-phase VL.

Further, as described above, the control circuit part 3 outputs the control signal Sd2 of the voltage value of either the low or high level to apply the control voltage to the control terminal of the second drive circuit 52. Thereby, whether or not to perform the feeding operation of the drive current by the second drive circuit 52 is switched by the control circuit part 3.

As illustrated in FIG. 3, the speed command signal Sc is inputted to the control circuit part 3. The control circuit part 3 performs drive control of the motor 20 based on the speed command signal Sc.

The speed command signal Sc is inputted from outside the control circuit part 3, for example. The speed command signal Sc is a signal concerning the rotational speed of the motor 20. For example, the speed command signal Sc is a PWM (pulse-width modulation) signal corresponding to a target rotational speed of the motor 20. In other words, the speed command signal Sc is information corresponding to a target value of the rotational speed of the motor 20. Note that a clock signal may be inputted as the speed command signal Sc.

The control circuit part 3 performs rotation control of the motor 20 by outputting the drive control signal Sd1 such that the motor 20 rotates at a rotation frequency corresponding to the speed command signal Sc. That is, the control circuit part 3 outputs the drive control signal Sd1 for driving the motor 20 to the first drive circuit 2 to perform the rotation control of the motor 20. The first drive circuit 2 outputs the drive signal to the motor 20 based on the drive control signal Sd1 to drive the motor 20.

As illustrated in FIG. 3, the control circuit part 3 includes a rotation frequency calculation part (an example of a detection unit) 31, a speed command analysis part 32, a PWM command part 33, a PWM signal generation part 35, and a drive circuit switching part (an example of a time measurement unit, an example of a comparison unit, an example of a determination unit, or an example of a switching unit) 37.

The Hall signal Sh outputted from the position sensor 5 is inputted to the rotation frequency calculation part 31. The rotation frequency calculation part 31 outputs a position signal indicating the positional relation between a prescribed phase and the rotor based on the inputted Hall signal Sh. The rotation frequency calculation part 31 also generates and outputs rotation frequency information corresponding to a period of the position signal based on the Hall signal Sh. That is, the rotation frequency calculation part 31 outputs actual rotation frequency information regarding an actual rotation frequency of the rotor of the motor 20. In the figure, an actual rotation signal S2 combining the position signal and the actual rotation frequency information is illustrated. The actual rotation signal S2 is outputted to the PWM command part 33.

The rotation frequency calculation part 31 also generates a rotation frequency signal S based on the Hall signal Sh and outputs the rotation frequency signal S to the control device 80. The rotation frequency signal S is a FG signal, for example.

The speed command signal Sc is inputted to the speed command analysis part 32. The speed command analysis part 32 outputs a target rotation frequency signal S1 (hereinafter, also simply referred to as a target rotation frequency S1) indicating a target rotation frequency of the motor 20 based on the speed command signal Sc. The target rotation frequency S1 is a PWM signal indicating a duty ratio corresponding to the speed command signal Sc. The target rotation frequency S1 is outputted to the PWM command part 33.

The actual rotation signal S2 outputted from the rotation frequency calculation part 31 and the target rotation frequency S1 which corresponds to the speed command signal Sc and is outputted from the speed command analysis part 32 are inputted to the PWM command part 33. The PWM command part 33 outputs a PWM configuration instruction signal S3 based on the actual rotation signal S2, that is, the position signal and the actual rotation frequency information, and the target rotation frequency S1. The PWM configuration instruction signal S3 is information indicating the duty ratio for outputting the drive control signal Sd1. The PWM configuration instruction signal S3 is outputted to the PWM signal generation part 35.

The PWM command part 33 compares the target rotation frequency S1 with the actual rotation frequency information corresponding to a rotation frequency of the motor 20, and generates the PWM configuration instruction signal S3 such that the rotational speed of the motor 20 is that corresponding to the target rotation frequency S1.

The PWM configuration instruction signal S3 is inputted to the PWM signal generation part 35. The PWM signal generation part 35 generates a drive control signal Sd1, based on the PWM configuration instruction signal S3, for driving the first drive circuit 2. The drive control signal Sd1 is a PWM signal of which a duty ratio is the same as the PWM configuration instruction signal S3, for example. In other words, the drive control signal Sd1 is a signal having a duty ratio corresponding to that of the PWM configuration instruction signal S3.

The drive control signal Sd1 outputted from the PWM signal generation part 35 is outputted from the control circuit part 3 to the first drive circuit 2. This allows the drive signal to be outputted from first drive circuit 2 to the motor 20 so that the motor 20 is driven.

A position detection signal S5 outputted from the rotation frequency calculation part 31 is inputted the drive circuit switching part 37 as described later. As will be described in detail hereinafter, the drive circuit switching part 37 determines whether or not the drive state of the motor 20 is abnormal based on the position detection signal S5. Then, depending on a result of the determination, the drive circuit switching part 37 outputs a control signal S6 to the PWM signal generation part 35, or outputs a control signal Sd2 to the second drive circuit 52 to perform control of switching a drive circuit feeding a drive current to the motor 20 from the first drive circuit 2 to the second drive circuit 52.

To be more specific, when the drive circuit switching part 37 determines that the drive state of the motor 20 is abnormal, the drive circuit switching part 37 outputs the control signal S6 to the PWM signal generation part 35. The control signal S6 is a stop control signal for stopping the PWM signal generation part 35 from outputting the drive control signal Sd1. That is, the control signal S6 is outputted from the drive circuit switching part 37 to the PWM signal generation part 35, and thereby, the drive control signal Sd1 is stopped from being outputted from the control circuit part 3 to the first drive circuit 2 and the driving of the motor 20 by the first drive circuit 2 stops. When the drive circuit switching part 37 determines that the drive state of the motor 20 is abnormal, the drive circuit switching part 37 also outputs the control signal Sd2 to the second drive circuit 52. This starts the driving of the motor 20 by the second drive circuit 52. That is, the drive circuit switching part 37 operates as the switching unit configured to switch the drive circuit feeding the drive current to the motor 20 from the first drive circuit 2 to the second drive circuit 52 by outputting the control signal S6 and the control signal Sd2 in this manner.

Here, an abnormality determination operation to determine whether or not the drive state of the motor 20 is abnormal is performed by the control circuit part 3 as described below.

That is, in the present embodiment, the control circuit part 3 includes the detection unit configured to detect a change in the phase of the Hall signal Sh, a time measurement unit configured to measure a time depending on a detection timing of the detection of the change in the phase of the Hall signal Sh, a comparison unit configured to compare a first time measured by the time measurement unit with a second time measured before the first time is measured, and a determination unit configured to determine that the drive state of the motor 20 is abnormal based on a comparison result of the comparison of the first time with the second time.

To be more specific, the rotation frequency calculation part 31, which operates as the detection unit, detects both fall in which the position signal switches from a phase of a high level to a phase of a low level and rise in which the position signal switches from the phase of a low level to the phase of a high level, and outputs the position detection signal S5 indicating the detected timing. The position detection signal S5 is outputted to the drive circuit switching part 37. Note that the rotation frequency calculation part 31 may be configured to detect any one of the fall of the position signal and the rise of the position signal to output the position detection signal S5.

The drive circuit switching part 37 operates as the time measurement unit when the motor 20 is driven by the first drive circuit 2 to measure a time depending on the detection timing of the change in the phase of the Hall signal Sh based on the position detection signal S5. In the present embodiment, the drive circuit switching part 37 measures, based on the position detection signal S5, a low duration (duration time of the low level) from a timing when fall of the Hall signal Sh is detected to a timing when rise of the Hall signal Sh is detected and a high duration (duration time of the high level) from a timing when rise of the Hall signal Sh is detected to a timing when fall of the Hall signal Sh is detected. The time measurement is performed by counting a clock signal using a timer, for example, and a count value of the timer is obtained for the low duration or the high duration. The time measurement may be performed for any one of the high duration and the low duration. The time measurement may be performed for a duration different from the above such as one period or a plurality of periods of the Hall signal Sh.

The drive circuit switching part 37 operates as the comparison unit to compare a current time measurement result (an example of the first time) with a past time measurement result (an example of the second time). Then, the drive circuit switching part 37 determines that the drive state of the motor 20 is abnormal based on a comparison result of the comparison of the current time measurement result with the past time measurement result. The drive circuit switching part 37 performs both comparison between the time measurement results of low durations and comparison between the time measurement results of the high durations. The drive circuit switching part 37 may perform any one of the comparison between the time measurement results of low durations and the comparison between the time measurement results of the high durations. Note that the past time measurement result(s) compared here is at a time measuring occasion of one or continuous plural periods immediately before a time measuring occasion when a time is measured for the current time measurement result (one period prior), but is not limited thereto. Such a comparison is performed so that the drive circuit switching part 37 determines whether or not the motor 20 is tending to reduce the speed.

Note that, in the present embodiment, in a case where the rotational speed of the rotor of the motor 20 (current speed) and the target rotational speed of the rotor of the motor 20 (target speed) meet prescribed conditions, the drive circuit switching part 37 compares the time measurement results. The prescribed conditions include at least that the rotational speed of the rotor of the motor 20 is lower than the target rotational speed of the rotor of the motor 20. By doing so, in a case where the motor 20 is reducing the speed in accordance with the speed command signal Sc, the time measurement result at that time does not have an effect on the abnormality determination. In the present embodiment, as the prescribed conditions, in a case where the target speed is higher than a speed obtained by multiplying the current speed by ¾, the time measurement result is compared. Note that a coefficient by which the current speed is multiplied is not limited to the above value, and can be set to a proper value in consideration of a magnitude of rotation fluctuation or the like.

The drive circuit switching part 37 compares, every time the time measurement is performed, a current time measurement result (measured time) measured at that time with a time measurement result (measured time) measured prior by one period in a time measuring occasion immediately before the current time measurement, and increments a value of a counter for determination in a case where the current time measurement result is longer than the time measurement result prior thereto by one period. In the case of comparing the current time measurement result with the time measurement result prior thereto by one period, if the current time measurement result is not longer than the time measurement result prior thereto by one period, the drive circuit switching part 37 compares the current time measurement result with a time measurement result (an example of a third time) prior by two periods in the time measuring occasion immediately before the current time measurement is measured. Then, if the current time measurement result is longer than the time measurement result prior thereto by two periods, the drive circuit switching part 37 varies the value of the counter. At this time, the value of the counter is changed to be smaller than a value of the counter otherwise incremented in the case where the current time measurement result is longer than the time measurement result prior thereto by one period. That is, the value of the counter is changed to be weighted depending on the comparison result of the time measurement result. Then, when the value of the counter becomes larger than a prescribed threshold, the drive circuit switching part 37 operates as the determination unit to determine that the drive state of the motor 20 is abnormal.

Here, in the abnormality determination operation by the drive circuit switching part 37, the drive state of the motor 20 is determined to be abnormal also in a case below. That is, when a prescribed time period has elapsed from the timing when the fall of the Hall signal Sh is detected with the rise of the Hall signal Sh being not detected, the drive circuit switching part 37 determines that the drive state of the motor 20 is abnormal. When a prescribed time period has elapsed from the timing when the rise of the Hall signal Sh is detected with the fall of the Hall signal Sh being not detected, the drive circuit switching part 37 determines that the drive state of the motor 20 is abnormal.

Figure 4:
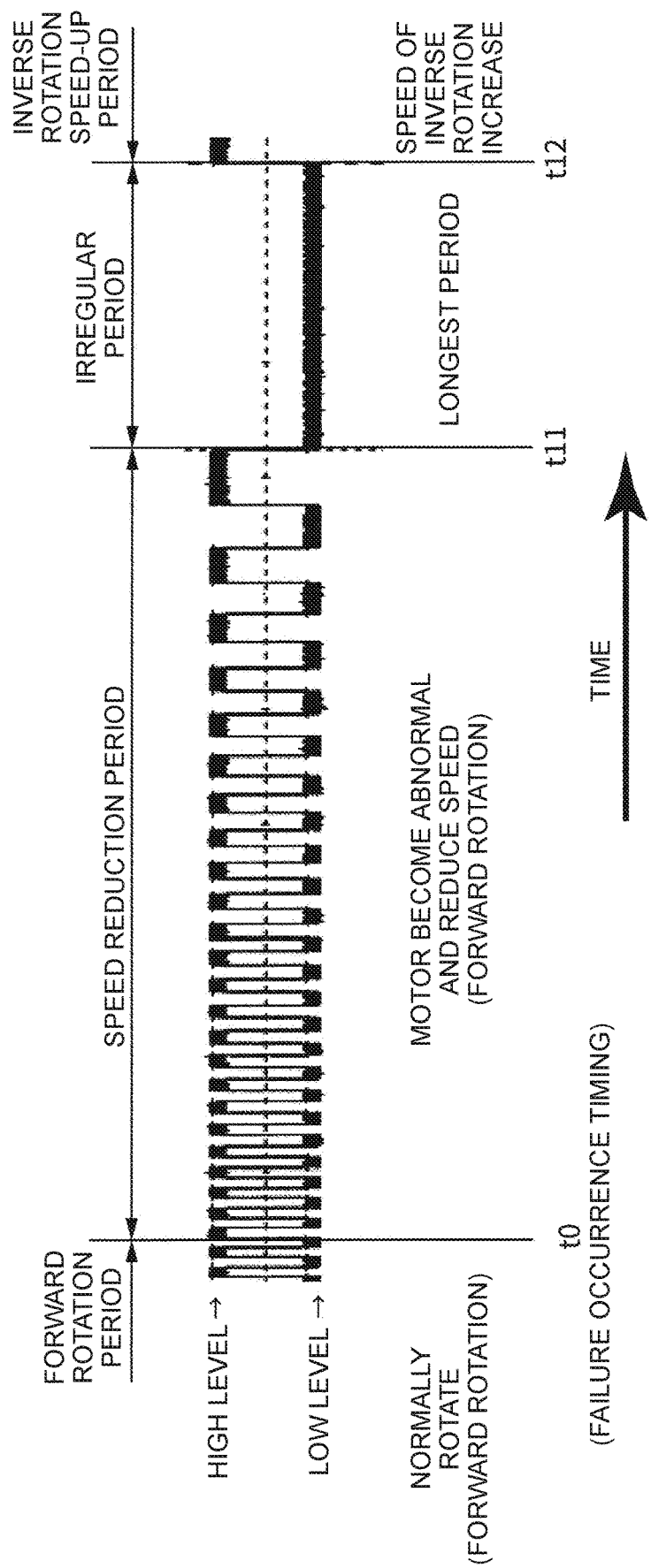
FIG. 4 is a waveform diagram illustrating a typical example of a Hall signal when the motor during driving transitions from forward rotation to inverse rotation.

FIG. 4 is a waveform diagram illustrating a typical example of a Hall signal when the motor 20 during driving transitions from forward rotation to inverse rotation.

In FIG. 4, a case is illustrated in which the motor 20 drives in a state that a torque (torque in an inverse rotational direction) in a direction opposite to a direction of a torque applied by the drive circuit of the motor 20 (torque in a forward rotational direction) is always applied to the rotor of the motor 20. In a state like this, until a time t0, the motor 20 is driven by the drive circuit such that the motor 20 normally rotates (forward rotation period).

Here, assume a case that at the time t0, failure occurs in the drive circuit, and the torque in the forward rotational direction is not applied to the motor 20. In this case, the speed of the rotation of the motor 20 reduces due to the torque in the inverse rotational direction. In this speed reduction period, as the rotational speed gradually lowers, a period of the Hall signal Sh gradually lengthens. That is, the high duration or the low duration in each period gradually lengthens.

After that, at a time t11, when the rotational speed of the motor 20 becomes substantially zero, an irregular period starts. In the irregular period, the phase of the Hall signal Sh does not change (fixed to the high level or the low level), and the high duration (duration time of the high level) or the low duration (duration time of the low level) of the Hall signal Sh is the longest. There is a high possibility that the rotational direction of the motor 20 changes from the forward rotation to the inverse rotation at a certain timing in the irregular period (at an irregular timing).

After the rotational direction changes to the inverse rotation, at and after a time t12 when the phase of the Hall signal Sh changes, an inverse rotation speed-up period starts in which the rotational speed of the motor 20 in inverse rotational direction gradually increases due to the torque in the inverse rotational direction.

In this way, an abnormality occurrence in the drive circuit of the motor 20 can be rapidly detected by performing the abnormality determination operation according to the present embodiment described above from when an abnormality occurs in the drive circuit of the motor 20 until the motor 20 transitions from the forward rotation to the inverse rotation to detect that the rotation of the motor 20 is tending to reduce the speed in the speed reduction period in which the high duration or the low duration continuously and gradually lengthens. Even if a prescribed time period elapses from the timing when the fall of the Hall signal Sh is detected with the rise of the Hall signal Sh being not detected, an abnormality occurrence in the drive circuit of the motor 20 can be detected at the latest in the irregular period by determining that the drive state of the motor 20 is abnormal.

As an example, an operation illustrated in a flowchart as below is performed by the control circuit part 3 to perform the abnormality determination operation as described above and the switching operation associated therewith in the motor device 1.

Figure 5:
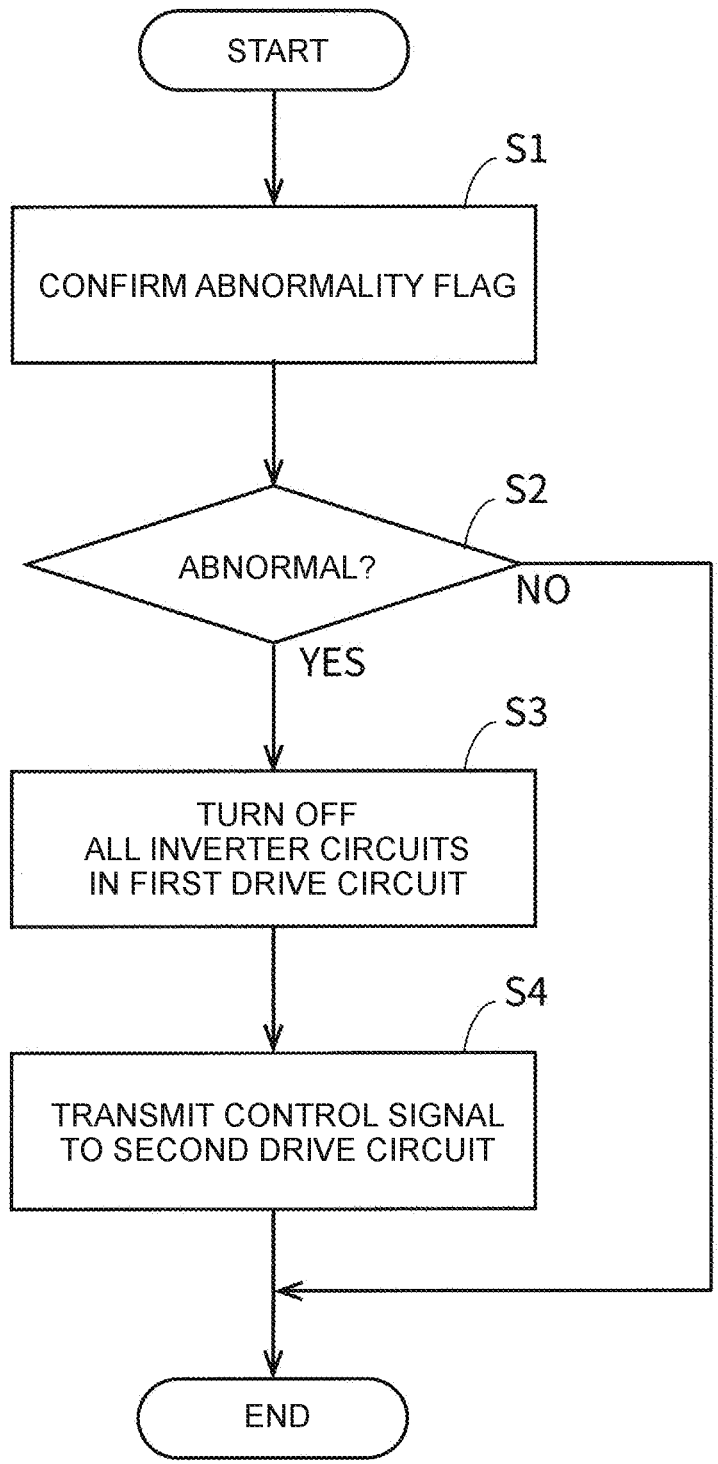
FIG. 5 is a flowchart illustrating an example of a switching operation.

FIG. 5 is a flowchart illustrating an example of the switching operation.

As illustrated in FIG. 5, in step S1, the drive circuit switching part 37 confirms an abnormality flag. The abnormality flag is a flag indicating whether or not an abnormality is determined in the abnormality determination operation.

In step S2, the drive circuit switching part 37 determines whether or not the drive state of the motor 20 is abnormal. That is, the drive circuit switching part 37 determines whether or not the abnormality flag indicates that an abnormality is determined. In a case where an abnormality is determined (YES), the process goes to step S3. In the other case (NO), a series of processes ends.

In step S3, the drive circuit switching part 37 output the control signal S6 to the PWM signal generation part 35. That is, the drive circuit switching part 37 stops the PWM signal generation part 35 from outputting the drive control signal Sd1 to the first drive circuit 2, and, as a result, outputting of the drive current fed from the inverter circuit 2a in the first drive circuit 2 to the motor 20 stops. This stops the driving of the motor 20 by the first drive circuit 2.

In step S4, the drive circuit switching part 37 outputs the control signal Sd2 to the second drive circuit 52. This starts the driving of the motor 20 by the second drive circuit 52. When step S4 ends, a series of processes ends.

The control circuit part 3 periodically perform the processing like this as illustrated in FIG. 5 at least while the motor 20 is driven by the first drive circuit 2. By doing so, in the case that an abnormality occurs in the driving of the motor 20 in the state that the motor 20 is driven by the first drive circuit 2, the drive circuit driving the motor 20 is switched from the first drive circuit 2 to the second drive circuit 52.

Figure 6:
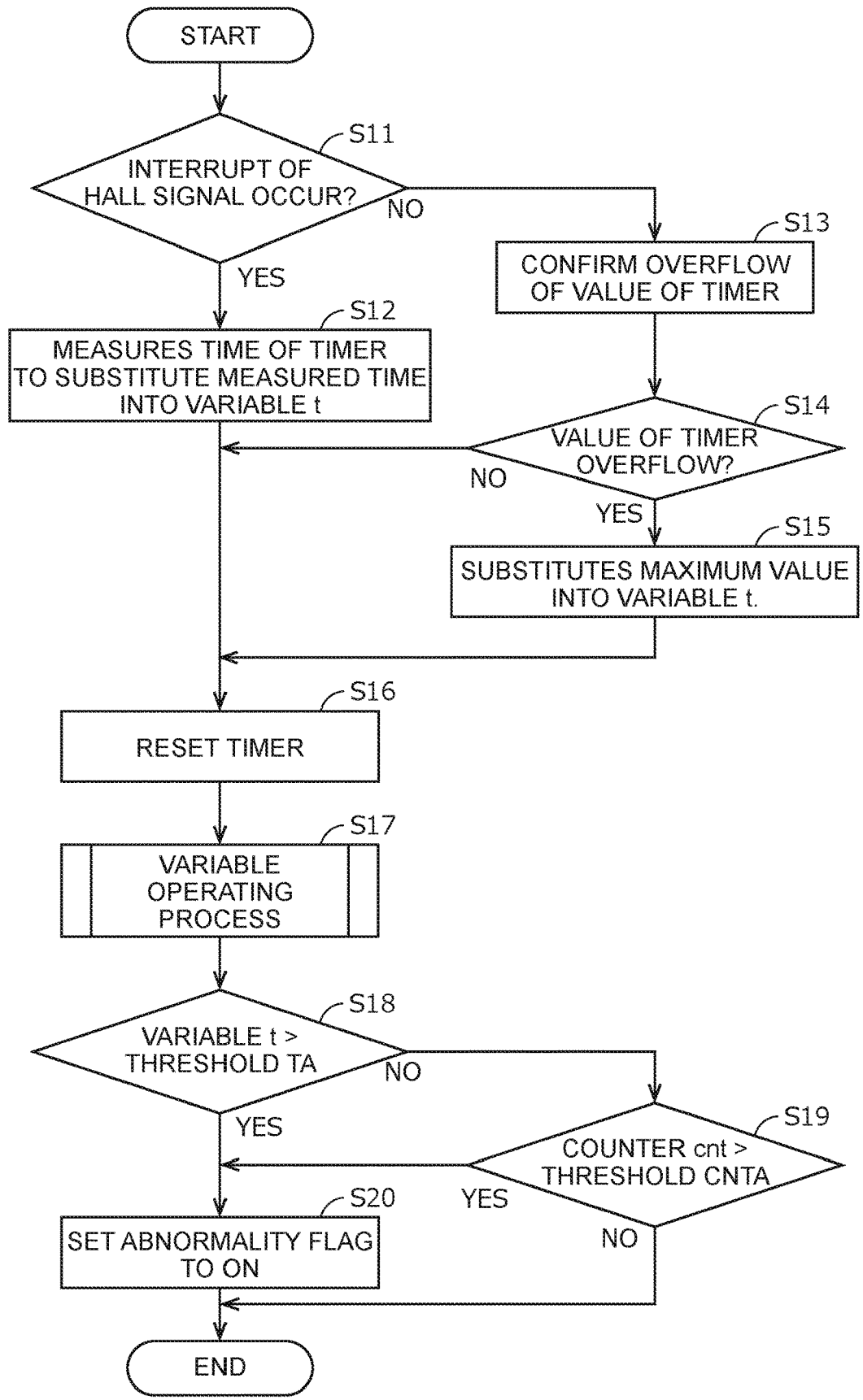
FIG. 6 is a flowchart illustrating an example of an abnormality determination operation.

FIG. 6 is a flowchart illustrating an example of the abnormality determination operation.

The control circuit part 3 periodically performs the processing illustrated in FIG. 6 at least while driving the motor 20 by the first drive circuit 2.

In step S11, the rotation frequency calculation part 31 determines whether or not an interrupt of the Hall signal Sh occurs. In a case where an interrupt occurs (that is, rise or fall of the Hall signal Sh is detected) (YES), the process goes to step S12. In a case where an interrupt does not occur (NO), the process goes to step S13.

In step S12, the drive circuit switching part 37 measures a time of the timer at this time to substitute the measured time into a variable t. That is, a count value corresponding to a length of the high duration or low duration which ends at that time is substituted into the variable t. After that, the process goes to step S16.

On the other hand, in step S13, the drive circuit switching part 37 confirms an overflow of the value of the timer which is being counted.

In step S14, the drive circuit switching part 37 determines whether or not the value of the timer overflows. In a case where the value of the timer does not overflow (NO), the process goes to step S16. In a case where the value of the timer overflows (YES), the process goes to step S15.

An upper limit of the value of the timer is set to a value corresponding to a rotation frequency enough lower than undershoot occurring when the rotation frequency is drastically decreased. For example, a value is set corresponding to a rotation frequency of a half of the lowest rotation frequency in a case of a normal driving. In a case where an abnormality such as the motor 20 stopping occurs, the value of the timer overflows.

In step S15, the drive circuit switching part 37 substitutes a maximum value into the variable t. After that, the process goes to step S16.

In step S16, the drive circuit switching part 37 resets the timer.

In step S17, a variable operating process is performed.

Figure 7:
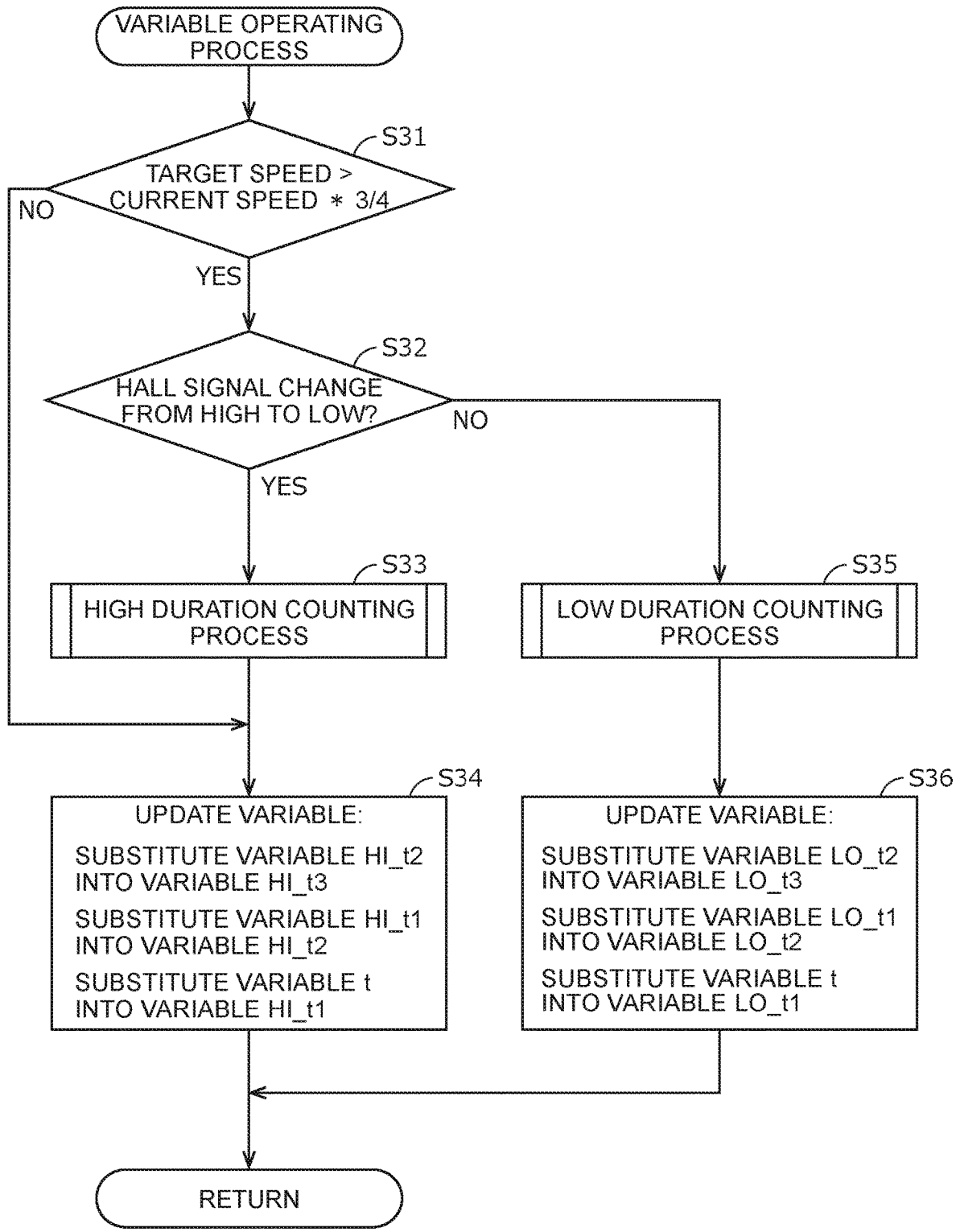
FIG. 7 is a flowchart illustrating an example of a variable operating process.

FIG. 7 is a flowchart illustrating an example of the variable operating process.

As illustrated in FIG. 7, in step S31, the control circuit part 3 determines whether or not the target speed is larger than a speed obtained by multiplexing the current speed by ¾. In a case where the target speed is larger than the speed obtained by multiplexing the current speed by ¾ (YES), the process goes to step S32. In the other case, the process goes to step S34.

In step S32, the drive circuit switching part 37 determines whether or not the Hall signal Sh changes from the high to the low. In a case where the Hall signal Sh changes from the high to the low, that is, in a case where the count value for the high duration is substitute into the variable t (YES), the process goes to step S33. In the other case, that is, in a case where the count value for the low duration is substituted into the variable t (NO), the process goes to step S35.

In step S33, the drive circuit switching part 37 performs the high duration counting process of comparing a current time measurement result (that is, variable t) with a past time measurement result regarding the high duration. This allows a value of a count value cnt to be changed.

In step S34, the drive circuit switching part 37 performs an update process of the variable for performing the next high duration counting process. That is, a variable HI_t2 (time measurement result prior by two periods) is substituted into a variable HI_t3 to be dealt with as the time measurement result prior by three periods in the next high duration counting process. A variable HI_t1 (time measurement result prior by one period) is substituted into the variable HI_t2 to be dealt with as the time measurement result prior by two periods in the next high duration counting process. The variable t (current time measurement result) is substituted into the variable HI_t1 to be dealt with as the time measurement result prior by one period in the next high duration counting process.

On the other hand, in step S35, the drive circuit switching part 37 performs the low duration counting process of comparing a current time measurement result (that is, variable t) with a past time measurement result regarding the low duration. This allows the value of the counted value cnt to be changed.

In step S36, the drive circuit switching part 37 performs the update process of the variable for performing the next low duration counting process. That is, a variable LO_t2 (time measurement result prior by two periods) is substituted into a variable LO_t3 to be dealt with as the time measurement result prior by three periods in the next low duration counting process. A variable LO_t1 (time measurement result prior by one period) is substituted into the variable LO_t2 to be dealt with as the time measurement result prior by two periods in the next low duration counting process. The variable t (current time measurement result) is substituted into the variable LO_t1 to be dealt with as the time measurement result prior by one period in the next low duration counting process.

When the process in step S34 or the process in step S36 ends, the variable operating process ends.

Here, the high duration counting process or the low duration counting process is performed as below.

Figure 8:
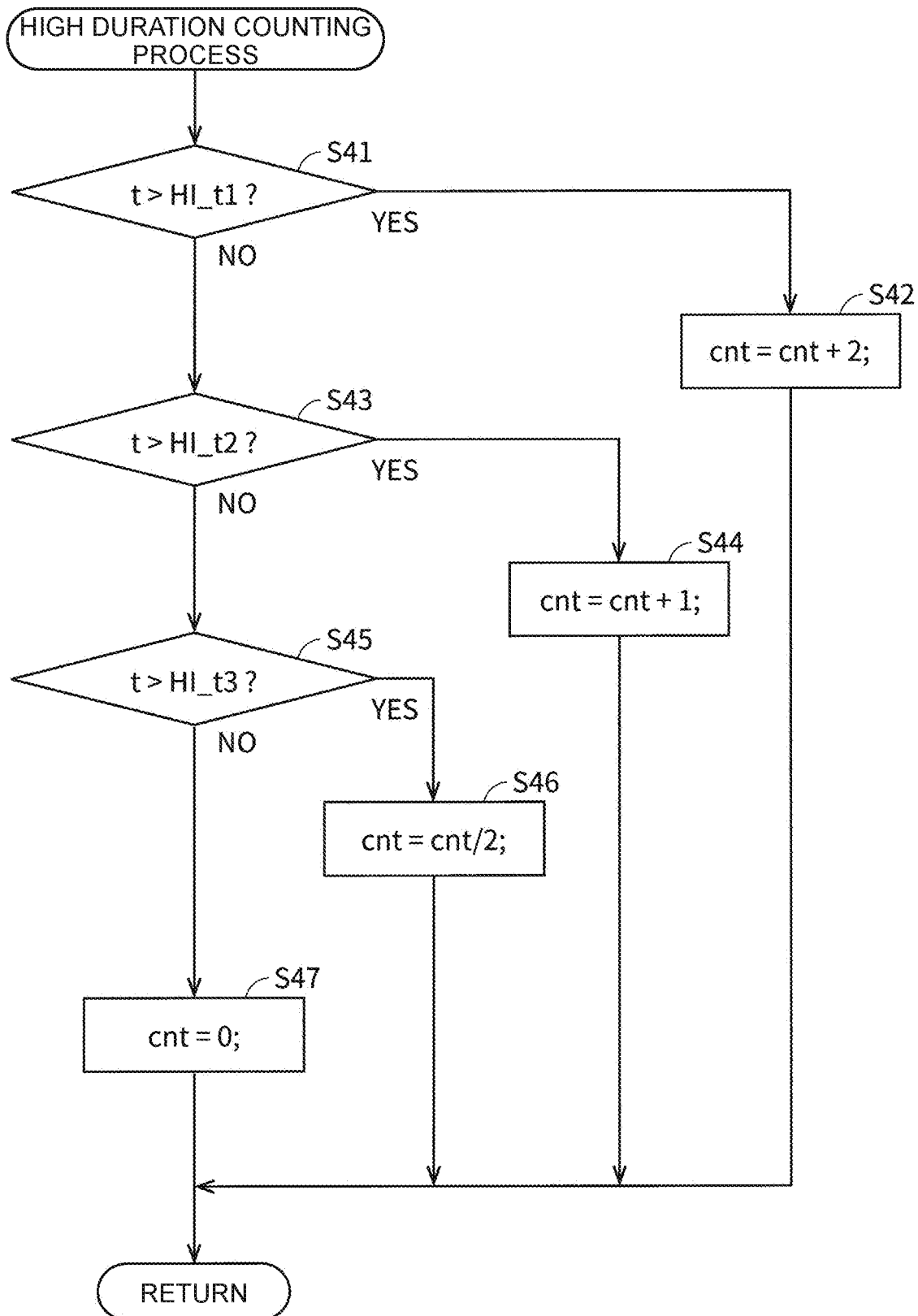
FIG. 8 is a flowchart illustrating an example of a high duration counting process.

FIG. 8 is a flowchart illustrating an example of the high duration counting process.

As illustrated in FIG. 8, in step S41, the drive circuit switching part 37 determines whether or not the variable t is larger than the variable HI_t1. That is, the drive circuit switching part 37 compares the current time measurement result (variable t) with the time measurement result (variable HI_t1) prior by one period that is the past time measurement result, regarding the time measurement result of the high duration. In a case where the variable t is larger than the variable HI_t1 (YES), the process goes to step S42, and in the other case, the process goes to step S43.

In step S42, the drive circuit switching part 37 increments the count value cnt by "2".

In step S43, the drive circuit switching part 37 determines whether or not the variable t is larger than the variable HI_t2. That is, the drive circuit switching part 37 compares the current time measurement result (variable t) with the time measurement result (variable HI_t2) prior by two periods that is the past time measurement result, regarding the time measurement result of the high duration. In a case where the variable t is larger than the variable HI_t2 (YES), the process goes to step S44, and in the other case, the process goes to step S45.

In step S44, the drive circuit switching part 37 increments the count value cnt by "1". That is, in this case, the count value cnt is smaller in the case through step S44 than in the case through step S42.

In step S45, the drive circuit switching part 37 determines whether or not the variable t is larger than the variable HI_t3. That is, the drive circuit switching part 37 compares the current time measurement result (variable t) with the time measurement result (variable HI_t3) prior by three periods that is the past time measurement result, regarding the time measurement result of the high duration. In a case where the variable t is larger than the variable HI_t3 (YES), the process goes to step S46, and in the other case, the process goes to step S47.

In step S46, the drive circuit switching part 37 performs a process in which a value obtained by dividing the count value cnt by 2 is set as a new count value cnt. That is, in this case, the count value cnt is to be smaller than that as it was.

In step S47, the drive circuit switching part 37 performs a process in which the count value cnt is set to "0".

If any one of steps S42, S44, S46, and S47 is performed, the high duration counting process ends and the process returns to the process illustrated in step S34 in FIG. 7.

Figure 9:
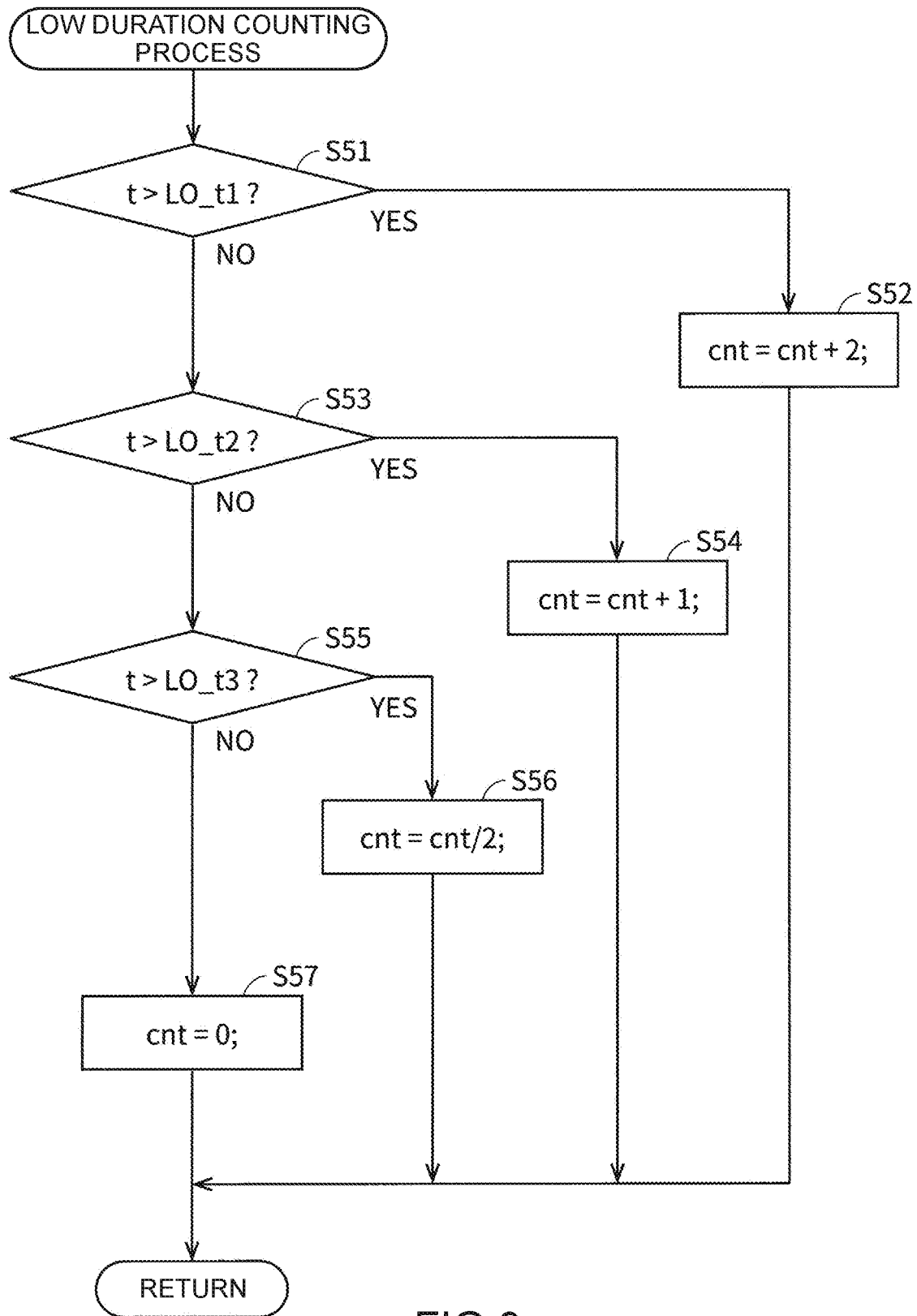
FIG. 9 is a flowchart illustrating an example of a low duration counting process.

FIG. 9 is a flowchart illustrating an example of the low duration counting process.

As illustrated in FIG. 9, in step S51, the drive circuit switching part 37 determines whether or not the variable t is larger than the variable LO_t1. That is, the drive circuit switching part 37 compares the current time measurement result (variable t) with the time measurement result (variable LO_t1) prior by one period that is the past time measurement result, regarding the time measurement result of the low duration. In a case where the variable t is larger than the variable LO_t1 (YES), the process goes to step S52, and in the other case, the process goes to step S53.

In step S52, the drive circuit switching part 37 increments the count value cnt by "2".

In step S53, the drive circuit switching part 37 determines whether or not the variable t is larger than the variable LO_t2. That is, the drive circuit switching part 37 compares the current time measurement result (variable t) with the time measurement result (variable LO_t2) prior by two periods that is the past time measurement result, regarding the time measurement result of the low duration. In a case where the variable t is larger than the variable LO_t2 (YES), the process goes to step S54, and in the other case, the process goes to step S55.

In step S54, the drive circuit switching part 37 increments the count value cnt by "1". That is, in this case, the count value cnt is smaller in the case through step S54 than in the case through step S52.

In step S55, the drive circuit switching part 37 determines whether or not the variable t is larger than the variable LO_t3. That is, the drive circuit switching part 37 compares the current time measurement result (variable t) with the time measurement result (variable LO_t3) prior by three periods that is the past time measurement result, regarding the time measurement result of the low duration. In a case where the variable t is larger than the variable LO_t3 (YES), the process goes to step S56, and in the other case, the process goes to step S57.

In step S56, the drive circuit switching part 37 performs a process in which a value obtained by dividing the count value cnt by 2 is set as a new count value cnt. That is, in this case, the count value cnt is to be smaller than that as it was.

In step S57, the drive circuit switching part 37 performs a process in which the count value cnt is set to "0".

If any one of steps S52, S54, S56, and S57 is performed, the low duration counting process ends and the process returns to the process illustrated in step S36 in FIG. 7.

If the variable operating process ends, the process goes to step S18 in FIG. 6. In step S18 in FIG. 6, the drive circuit switching part 37 determines whether or not the variable t is larger than a threshold TA. The threshold TA is set in advance such that the variable t is larger than the threshold TA when the rotation frequency is reached at which it is preferable to switch to the drive by the second drive circuit 52. When the value of the timer overflows also, the variable t is larger than the threshold TA. When the variable t is larger than the threshold TA (YES), the process goes to step S20. In the other case (NO), the process goes to step S19.

In step S19, the drive circuit switching part 37 determines whether or not the counter cnt is larger than a threshold CNTA. The threshold CNTA is set in advance such that count value cnt is larger than the threshold CNTA in a case where the drive state of the motor 20 is abnormal and the motor 20 reduces the speed. When the counter cnt is larger than the threshold CNTA (YES), the process goes to step S20. In the other case (NO), a series of processes ends.

In step S20, the drive circuit switching part 37 sets the abnormality flag to ON. That is, in step S20, the drive circuit switching part 37 determines that the drive state of the motor 20 is abnormal. If the process in the step S20 ends, a series of processes ends.

As described above, in the present embodiment, when the determination result based on the change in the phase of the Hall signal Sh meets a prescribed condition, the drive state of the motor 20 by the first drive circuit 2 is determined to be abnormal. Therefore, when an abnormality occurs, if the abnormality occurs in the speed reduction period or the irregular period, a rapid determination can be made. There are a variety of factors causing an abnormality to occur in the drive of the motor 20 by the first drive circuit 2, but the abnormality determination operation is performed based on the Hall signal Sh outputted depending on the rotation of the motor 20, and therefore, the abnormalities occurring due to the variety of the factors can be widely detected with a simple configuration and more reliably.

In comparing the current time measurement result with the past time measurement result in order to perform the abnormality determination, the comparison is made between the high durations or between the low durations of the Hall signal Sh. Therefore, even if ratios of the high durations and the low durations occupying one period of the Hall signal Sh are disproportionate (if each of the ratios of the high durations and the low durations is not 50%), it is possible to accurately determine a tendency of whether or not the speed reduces.

The count value cnt for performing the abnormality determination is counted based on the comparison of the current time measurement result with the past time measurement results of a plurality of periods. The count value cnt does not uniformly vary depending on the comparison with the past time measurement results, but the variation is weighted. Therefore, the count value cnt is reflective of a large tendency of the variation of the rotational speed, and even if a rotational situation of the motor 20 varies, an abnormal state can be accurately determined.

In the present embodiment, under a normal drive state, the motor 20 is three-phase driven by the first drive circuit 2 including the three-phase inverter circuit 2a. When something abnormal occurs in the first drive circuit 2, the abnormality is detected by the abnormality determination operation, the drive circuit is rapidly switched to the second drive circuit 52 including the single-phase inverter circuit 52a, and the motor 20 is single-phase driven by the second drive circuit 52. That is, the motor device 1 includes the first drive circuit 2 used as a main drive circuit for applying an electric current to the coils Lu, Lv, and Lw of the three phases of the motor 20, and includes the second drive circuit 52 used as a backup circuit for applying an electric current to the coils Lu2, Lv2, and Lw2 of the single phase of the motor 20. The second drive circuit 52 is a separate drive circuit from the first drive circuit 2.

In a case where only the first drive circuit 2 is provided in the motor device 1, it is not possible to prevent the motor 20 from being rotated inversely by an external force when the first drive circuit 2 breaks down so that the motor 20 cannot be driven. Even if a short brake is brought in effect, the motor 20 is difficult to stop even though a rotational speed of the inverse rotation can be reduced.

In contrast, in the present embodiment, even if the motor device 1 turns into an abnormal state due to a failure or the like of the first drive circuit 2, the second drive circuit 52 of the simple structure can apply a torque by the single-phase drive to the motor 20. Therefore, at least the motor 20 can be prevented from being rotated inversely. In addition, when the external force for inversely rotating the motor 20 is small, the motor 20 can be rotated forward by the torque by the single-phase drive. Therefore, it is possible with the present embodiment to suppress the manufacturing cost of the motor device 1 low and also to suppress an influence even when an abnormal state occurs in the motor device 1 so that it becomes impossible to drive the motor 20 as in a normal state.

When the motor device 1 is in an abnormal state caused by the failure of the first drive circuit 2 or the like, the drive can be rapidly switched to the drive by the second drive circuit 52 before the motor 20 transition to the inverse rotation. Therefore, a torque required for forward rotating the motor 20 may be small, and the motor 20 can be rapidly forward rotated.

For example, the device described in Japanese Patent Application Laid-Open No. 2014-91455 mentioned above includes the drive circuits of two systems having an equivalent function. Thus, even in a case where the drive circuit of the one of the systems breaks down, the motor can be driven equivalently by using the drive circuit of the other system. However, scale of the circuits becomes larger since the drive circuits of the two equivalent systems are used. Therefore, manufacturing cost of the motor drive control device becomes increased.

In contrast to this, in the present embodiment, the second drive circuit 52 used as the backup circuit is a circuit of a simple structure and single-phase drives the motor 20. Therefore, circuit scale of the motor device 1 can be made relatively small, so that manufacturing cost can be suppressed low.

There may be a method of sharing a part of the coils used for the three-phase drive with the coils used for the single-phase drive. However, in the present embodiment, the coils Lu2, Lv2, and Lw2 of the single phase used for the single-phase drive are coils independent from the coils Lu, Lv, and Lw of the three phases used for the three-phase drive. Therefore, even if an abnormal state (disconnection, short-circuit, or the like, for example) occurs in one of the coils Lu, Lv, and Lw of the three phases, it is possible to perform single-phase drive without being influenced by such state. Further, in a case of sharing driving coils, a switch may be required for shutting down a drive path so that the drive current is not flown from one of the drive circuit to the other drive circuit. In the embodiment, however, a three-phase drive system and a single-phase drive system are independent from each other, so that such switch is unnecessary. Therefore, the circuit structure of the motor device 1 can be simplified, and a component mount area can be reduced. Further, since the coils Lu2, Lv2, and Lw2 of the single phase are independent from the coils Lu, Lv, and Lw of the three phases, the structure of the coils Lu2, Lv2, and Lw2 of the single phase can be designed freely without taking the three-phase drive into consideration.

When the first drive circuit 2 breaks down in the motor device 1 using the motor 20 used as a fan motor, for example, the fan may be rotated inversely because there is a pressure difference generated between inside and outside or there is a wind blowing against the fan. Even in such case, in the present embodiment, the motor 20 can be single-phase driven by the second drive circuit 52. Thus, it is possible to maintain the motor 20 in a stop state so as not to rotate the fan inversely and to rotate the motor 20 forward. Therefore, even when the first drive circuit 2 breaks down, it is possible to prevent deterioration of a cooling function by the fan motor.

Others

The motor device and the motor drive control device therefor are not limited to the circuit configurations described in the above embodiment and its modification example. A variety of circuit configuration configured to adapt to an object of the present disclosure can be used. Features of the above embodiment and the modification example may be partially combined to form the motor device and its motor drive control device. In the above embodiment and the modification example, some constituent elements may be not provided, or some constituent elements may be formed of another aspect. For example, in the present embodiment, the description is given of the control circuit part 3 including the rotation frequency calculation part 31 and the drive circuit switching part 37 which are constituent elements of the abnormality determination device, but the rotation frequency calculation part 31 and the drive circuit switching part 37 may not be necessarily included in the control circuit part 3. For example, the rotation frequency calculation part and the drive circuit switching part may be provided as a circuit independent from the control circuit part. In this case, the control circuit part (drive control unit) is configured to include the speed command analysis part, the PWM command part, and the PWM signal generation part, and the abnormality determination device is configured to include the rotation frequency calculation part (an example of the detection unit) and the drive circuit switching part (an example of the time measurement unit, an example of the comparison unit, an example of the determination unit, an example of the switching unit). The time measurement unit, the comparison unit, the determination unit, and the switching unit may be configured as respective circuits separate from each other.

The threshold TA, the threshold CNTA, the rule for updating the count value, the coefficient, and the upper limit of the timer described above can be adequately configured such that an abnormal state can be determined depending on a specification, use and the like of the motor during the speed reduction period and the irregular period when an abnormality occurs, for example.

At least a part of the constituent elements of the motor drive control device may not be a process by means of hardware but may be a process by means of software.

The motor driven by the motor drive control device according to the present embodiment is not limited to the three-phase brushless motor, but may be a single-phase motor or another type of motor. The number of Hall ICs is not limited to one. A detector different from the Hall IC may be used to obtain the position detection signal of the motor. For example, a Hall element and the like may be used. The motor may be driven by a sensor-less system which does not use the position sensor such as a Hall element and a Hall IC.

The above flowcharts and the like illustrate an example of the operation without limitation. The steps illustrated in the respective diagrams of the flowcharts are specific examples, and are not limited to those flowcharts. For example, an order of the steps may be modified, another process may be inserted between the steps, and the processes may be in parallel.

All or a part of the processes in the embodiment may be performed by means of software, or may be performed by means of a hardware circuit. For example, the control circuit part is not limited to a microcomputer. At least a part of the configuration of the inside of the control circuit part may be processed by means of software.

What is claimed is:

1. An abnormality determination device comprising:
   a detection unit configured to detect a change in a phase of a position signal, the phase of the position signal changing depending on a rotation of a rotor of a motor;
   a time measurement unit configured to measure a time depending on a detection timing of the detection of the change in the phase of the position signal;
   a comparison unit configured to compare a first time measured by the time measurement unit with a second time measured before the first time is measured; and
   a determination unit configured to determine that a drive state of the motor is abnormal based on a comparison result of the comparison of the first time with the second time, wherein
   the position signal is a signal with phase switching in accordance with the rotor of the motor alternately between a phase of a high level and a phase of a low level,
   the detection unit detects at least one of fall in which the position signal switches from the phase of the high level to the phase of the low level and rise in which the position signal switches from the phase of the low level to the phase of the high level, and
   the time measurement unit measures at least one of a low duration and a high duration, the low duration being from a timing when the fall of the position signal is detected to a timing when the rise of the position signal is detected, and the high duration being from a timing when the rise of the position signal is detected to a timing when the fall of the position signal is detected.

2. The abnormality determination device according to claim 1, wherein
   the comparison unit performs at least one of comparison between time measurement results of the low durations and comparison between time measurement results of the high durations.

3. The abnormality determination device according to claim 1, wherein
   the determination unit determines that the drive state of the motor is abnormal when a prescribed time period elapses from the timing when the fall of the position signal is detected with the rise of the position signal being not detected, and when a prescribed time period elapses from the timing when the rise of the position signal is detected with the fall of the position signal being not detected.

4. The abnormality determination device according to claim 1, wherein
   the comparison unit compares the first time with the second time in a case where a rotational speed of the rotor of the motor and a target rotational speed of the rotor of the motor meet prescribed conditions.

5. The abnormality determination device according to claim 4, wherein
   the prescribed conditions include at least that the rotational speed of the rotor of the motor is lower than the target rotational speed of the rotor of the motor.

6. The abnormality determination device according to claim 1, wherein
   the second time is a time measured in a time measuring occasion immediately before a time measuring occasion when the first time is measured.

7. The abnormality determination device according to claim 1, wherein
   the comparison unit compares, every time the time measurement is performed by the time measurement unit, the first time measured at that time with the second time measured in a time measuring occasion immediately before the first time, and increments a value of a counter for determination in a case where the first time is longer than the second time, and
   the determination unit determines that the drive state of the motor is abnormal when the value of the counter becomes larger than a prescribed threshold.

8. The abnormality determination device according to claim 7, wherein
   in the case of comparing the first time with the second time, if the first time is not longer than the second time, the comparison unit compares the first time with a third time measured in a time measuring occasion immediately before the time measuring occasion when the second time was measured, and if the first time is longer than the third time, the comparison unit sets the value of the counter to be smaller as compared with the case where the first time is longer than the second time.

9. A motor device comprising:

a motor including coils of a first system and coils of a second system;

a drive circuit of the first system capable of feeding a drive current to the coils of the first system;

a drive circuit of the second system, different from the drive circuit of the first system, capable of feeding a drive current to the coils of the second system;

a drive control unit configured to control an operation of the drive circuit of the first system to drive the motor by the drive circuit of the first system;

an abnormality determination device; and a switching unit configured to switch the drive circuit feeding the drive current to the motor from the drive circuit of the first system to the drive circuit of the second system when a drive state of the motor is determined to be abnormal by the abnormality determination device in a case where the motor is driven by the drive circuit of the first system, wherein the abnormality determination device comprises:

a detection unit configured to detect a change in a phase of a position signal, the phase of the position signal changing depending on a rotation of a rotor of a motor;

a time measurement unit configured to measure a time depending on a detection timing of the detection of the change in the phase of the position signal;

a comparison unit configured to compare a first time measured by the time measurement unit with a second time measured before the first time is measured; and a determination unit configured to determine that a drive state of the motor is abnormal based on a comparison result of the comparison of the first time with the second time.

10. The motor according to claim 9, further comprising:

a position sensor outputting a position signal depending on a position of a rotor the motor, wherein the drive control unit controls the operation of the drive circuit of the first system based on the position signal, and the detection unit detects a change in a phase of the position signal.

11. An abnormality determination method comprising the steps of:

detecting a change in a phase of a position signal, the phase of the position signal changing depending on a rotation of a rotor of a motor;

measuring a time depending on a detection timing of the detection of the change in the phase of the position signal;

comparing a first time measurement result with a second time measurement result obtained after the first time measurement result is obtained; and determining that a drive state of the motor is abnormal based on a comparison result of the comparison of the first time measurement result with the second time measurement result wherein the position signal is a signal with phase switching in accordance with the rotor of the motor alternately between a phase of a high level and a phase of a low level, the step of detecting the change in a phase of a position signal includes a step of detecting at least one of fall in which the position signal switches from the phase of the high level to the phase of the low level and rise in which the position signal switches from the phase of the low level to the phase of the high level, and the step of measuring the time includes a step of measuring at least one of a low duration and a high duration, the low duration being from a timing when the fall of the position signal is detected to a timing when the rise of the position signal is detected, and the high duration being from a timing when the rise of the position signal is detected to a timing when the fall of the position signal is detected.

\* \* \* \* \*